(12) United States Patent
Wang et al.

(10) Patent No.: US 11,907,191 B2
(45) Date of Patent: Feb. 20, 2024

(54) CONTENT BASED LOG RETRIEVAL BY USING EMBEDDING FEATURE EXTRACTION

(71) Applicant: Dell Products L.P., Round Rock, TX (US)

(72) Inventors: Dale Wang, Hayward, CA (US); Min Gong, Shanghai (CN); Ashok Narayanan Potti, Bangalore (IN)

(73) Assignee: Dell Products L.P., Round Rock, TX (US)

( * ) Notice: Subject to any disclaimer, the term of this patent is extended or adjusted under 35 U.S.C. 154(b) by 5 days.

(21) Appl. No.: 17/722,902

(22) Filed: Apr. 18, 2022

(65) Prior Publication Data

US 2023/0334035 A1 Oct. 19, 2023

(51) Int. Cl.
*G06F 16/22* (2019.01)

(52) U.S. Cl.
CPC .................. *G06F 16/2237* (2019.01)

(58) Field of Classification Search
CPC ....... G06F 16/2237; G06F 16/22; G06F 16/20
See application file for complete search history.

(56) References Cited

U.S. PATENT DOCUMENTS

| | | | | |
|---|---|---|---|---|
| 10,187,409 | B1* | 1/2019 | Averbuch | G06F 21/55 |
| 10,530,795 | B2* | 1/2020 | Pande | G06N 20/00 |
| 10,810,491 | B1* | 10/2020 | Xia | G06N 3/04 |
| 10,936,658 | B2* | 3/2021 | Wu | G06F 16/9024 |
| 11,082,438 | B2* | 8/2021 | Peinador | G06N 3/04 |
| 11,374,953 | B2* | 6/2022 | Givental | G06F 16/55 |
| 11,379,220 | B2* | 7/2022 | Sobran | G06F 8/75 |
| 2020/0076842 | A1* | 3/2020 | Zhou | G06N 5/02 |
| 2020/0174870 | A1* | 6/2020 | Xu | G06F 11/0769 |
| 2021/0166105 | A1* | 6/2021 | Panjwani | G06N 3/08 |
| 2021/0357282 | A1* | 11/2021 | Verma | G06N 3/044 |

* cited by examiner

*Primary Examiner* — Miranda Le
(74) *Attorney, Agent, or Firm* — Womble Bond Dickinson (US) LLP

(57) ABSTRACT

Methods and systems for managing data processing systems are disclosed. A data processing system may include hardware and/or software components. The operation of the data processing system may depend on the operation of these components. To manage the operation of the data processing system, a system may include a data processing system manager. The data processing system manager may obtain logs for components of the data processing system reflecting the historical operation of these components and use the log to predict the future operation of the data processing system, identify similar operation of other data processing systems, and/or for other purposes. Based on the predictions, the data processing system manager may take action to reduce the likelihood of the data processing system becoming impaired.

20 Claims, 10 Drawing Sheets

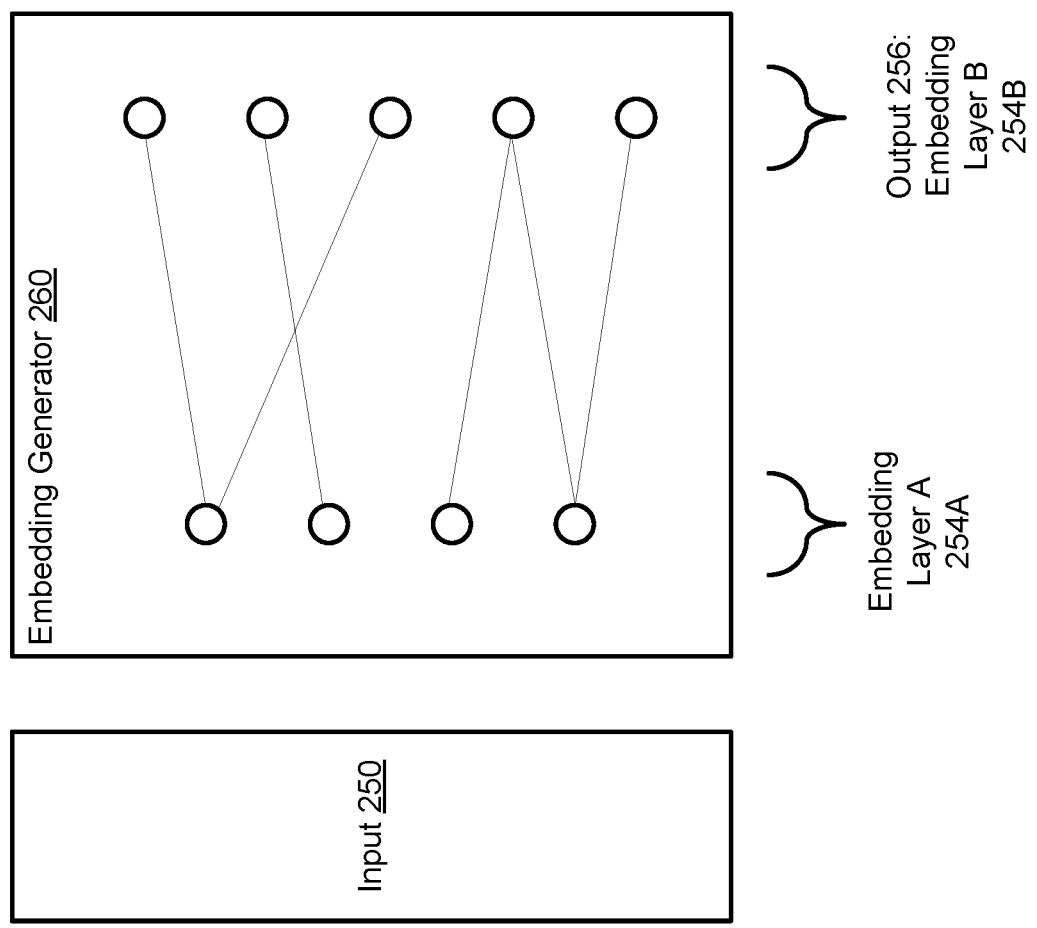

CONTENT BASED LOG RETRIEVAL BY USING EMBEDDING FEATURE EXTRACTION

FIELD

Embodiments disclosed herein relate generally to device management. More particularly, embodiments disclosed herein relate to systems and methods to manage the operation of devices through log analysis.

BACKGROUND

Computing devices may provide computer implemented services. The computer implemented services may be used by users of the computing devices and/or devices operably connected to the computing devices. The computer implemented services may be performed with hardware components such as processors, memory modules, storage devices, and communication devices. The operation of these components may impact the performance of the computer implemented services.

BRIEF DESCRIPTION OF THE DRAWINGS

Embodiments disclosed herein are illustrated by way of example and not limitation in the figures of the accompanying drawings in which like references indicate similar elements.

FIG. 2C shows a block diagram illustrating an embedding generator in accordance with an embodiment.

DETAILED DESCRIPTION

Figure 1:
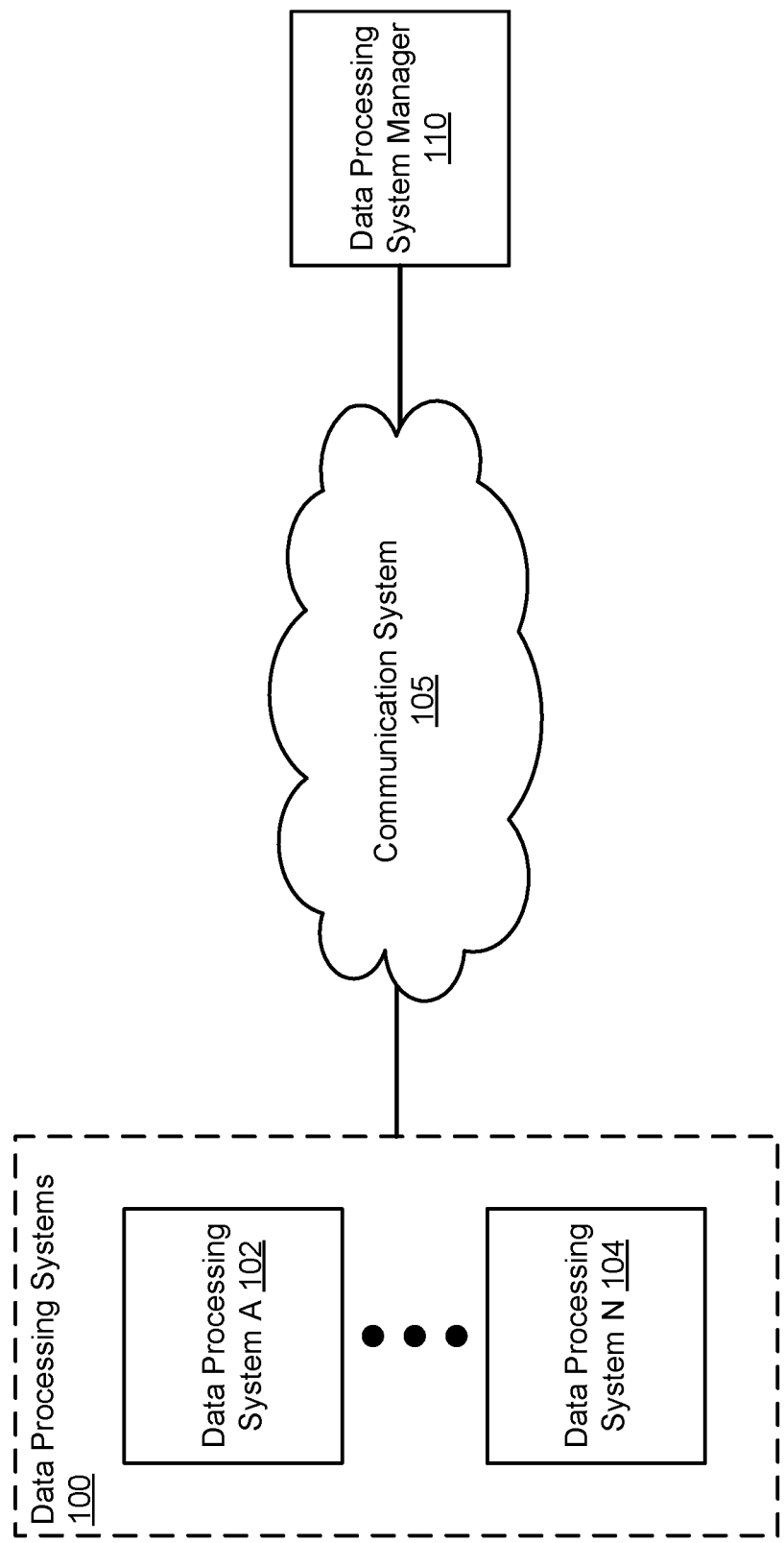
FIG. 1 shows a block diagram illustrating a system in accordance with an embodiment.

Various embodiments will be described with reference to details discussed below, and the accompanying drawings will illustrate the various embodiments. The following description and drawings are illustrative and are not to be construed as limiting. Numerous specific details are described to provide a thorough understanding of various embodiments. However, in certain instances, well-known or conventional details are not described in order to provide a concise discussion of embodiments disclosed herein.

Reference in the specification to "one embodiment" or "an embodiment" means that a particular feature, structure, or characteristic described in conjunction with the embodiment can be included in at least one embodiment. The appearances of the phrases "in one embodiment" and "an embodiment" in various places in the specification do not necessarily all refer to the same embodiment.

References to an "operable connection" or "operably connected" means that a particular device is able to communicate with one or more other devices. The devices themselves may be directly connected to one another or may be indirectly connected to one another through any number of intermediary devices, such as in a network topology.

In general, embodiments disclosed herein relate to methods and systems for managing data processing system. A data processing system may include one or more hardware and/or software components. The operation of the data processing system may depend on the operation of these components. For example, improper operation of any of these components may impair (e.g., reduce performance, reduce functionality, etc.) the operation of the data processing system.

To manage the operation of the data processing system, the system may include a data processing system manager. The data processing system manager may obtain logs for data processing systems reflecting the historical operation of these data processing systems and use the log to predict the future operation of the data processing system, identify data processing systems that have operated similarly in the past, and/or to provide other functions.

To do so, the data processing system manager may obtain embedding generators usable to obtain vector representations of logs. The vector representations of the logs may be stored in a vector indexed database to obtain a highly searchable data structure.

When new logs are obtained, a vector for the new log may be generated. The newly obtained vector may be used to index the database to identify useful information. The useful information may include, for example, information regarding data processing systems that operated similarly in the past, events associated with the logs, and/or other types of information stored or associated with the vector indexed database.

The vector indexed database may also be used to, for example, obtain graphical representations of clusters of logs. These graphical representations may be used to perform root cause analysis. The root causes may then be used to identify plans for remediating similar issues encountered in the future.

By doing so, an improved computing device and/or distributed system may be obtained. The improved device and/or system may have higher uptime and/or more resilient to impairment.

In an embodiment, a computer-implemented method for managing data processing systems is provided. The method may include obtaining logs for the data processing systems, each of the logs comprising log entries associated with an event; obtaining a trained machine learning model using the logs for the data processing systems, the trained machine learning model comprising a plurality of embedding vectors; selecting one of the embedding vectors as an output for an embedding generator; obtaining, using the logs and the embedding generator, vector representations for the logs; storing the vector representations in a vector indexing based database; obtaining a data processing system support request for a data processing system of the data processing system, the support request including a log pattern; indexing, using the log pattern, the database to identify a related log of the logs; identifying the event associated with the related log; and performing an action set, based on the event, to service the data processing system support request.

The data processing system support request may be a request to obtain a log of the logs that is similar to a new log from which the log pattern was obtained.

Indexing the database may include obtaining a vector representation for the new log using the embedding generator; performing a nearest neighbor lookup in the database using the vector representation of the new log and the database to identify a vector of the vector representations in the database; identifying the related log of the logs based on the identity of the vector of the vector representations in the database; and returning a copy of the related log to a requestor to service the data processing system support request.

Indexing the database may include identifying clusters of the vector representations of the logs; obtaining a vector representation for the new log using the embedding generator; obtaining a graphical representation of the clusters and the vector representation for the new log; obtaining user input based on the graphical representation, the user input indicating one cluster of the clusters; and identifying the related log based on the one cluster.

The logs may be labeled, the trained machine learning model may be trained using a supervised training method, the trained machine learning model may be adapted to output an event associated with the log entries of the logs based on an input.

Or, the logs may be unlabeled, the trained machine learning model may be trained using an unsupervised training method, the trained machine learning model may be adapted to output a log entry of the logs based on an input.

The action set may include disabling a function of a data processing system of the data processing systems; transferring a workload from a first data processing system of the data processing systems to a second data processing system of the data processing systems; disabling a hardware component of a data processing system of the data processing systems; and/or sending a notification to an administrator of a data processing system of the data processing systems of a predicted impairment of the data processing system.

A non-transitory media may include instructions that when executed by a processor cause the computer-implemented method to be performed.

A data processing system may include the non-transitory media and a processor, and may perform the computer-implemented method when the computer instructions are executed by the process.

Turning to FIG. 1, a block diagram illustrating a system in accordance with an embodiment is shown. The system shown in FIG. 1 may provide computer implemented services. The system may include data processing systems 100. Data processing systems 100 may include any number of computing devices that provide the computer implemented services. For example, data processing systems 100 may include one or more data processing systems 102, 104 that may independently and/or cooperatively provide the computer implemented services.

For example, all, or a portion, of data processing systems 102-104 may provide computer implemented services to users and/or other computing devices operably connected to data processing systems 100. The computer implemented services may include any type and quantity of services including, for example, database services, instant messaging services, video conferencing services, etc. Different systems may provide similar and/or different computer implemented services.

To provide the computer implemented services, data processing systems 100 may host applications that provide these (and/or other) computer implemented services. The applications may be hosted by one or more of data processing systems 100.

Any of data processing systems 102-104, and components thereof, as well as hosted entities (e.g., applications that provide computer implemented services, other applications that manage the operation of data processing systems 100, etc.), may be subject to undesired operation. For example, due to various operating conditions, flaws in design, and/or for other reasons, any of these hardware and/or software components may operate in a manner that diverges from nominal (e.g., desired) operation.

When operating, any of these components may generate one or more logs. A log may be a data structure that include operational information regarding data processing systems 100 such as, for example, descriptions of conditions encountered by a component, a time when the condition was encountered, an identifier associated with a condition and/or generator of the log, an indication of a relative level of importance or severity of the encountered conditions, and/or other types of information. While the logs may include information regarding the current operation of data processing systems 100, the logs may not specify how the data processing systems 100 and/or components thereof are likely to operate in the future, whether the operation is similar to the operation of other data processing systems, what action may be taken to resolve the future undesired operation, and/or may lack other information that may be used to managed data processing systems 100. Rather, the logs may generally include a representation of current and/or past operation of all or a portion of data processing systems 100. Thus, the logs may not be useful for proactively addressing potential future operating conditions of data processing systems 100, identifying common operational states among data processing systems 100, and/or root causes of undesired operation of data processing systems 100.

In general, embodiments disclosed herein may provide systems, devices, and methods for managing data processing systems to reduce the likelihood of the data processing systems operating in an undesired manager. A system in accordance with an embodiment may include data processing systems manager 110. Data processing system manager 110 may manage the operation of data processing systems 100.

To provide its functionality, data processing system manager 110 may (i) collect logs for the hardware and/or software components of data processing systems 100, (ii) generate lookup data structures using the logs that enable logs obtained in the future to be used to identify other data processing systems that have operated in a similar manner, and/or (iii) perform one or more actions (e.g., an "action set") to reduce the likelihood of data processing systems 100 operating in an undesirable manner in the future. By doing so, a system in accordance with embodiments disclosed herein may provide data processing systems having, for example, (i) improved uptime, (ii) improved user experiences by avoiding phantom slowdowns and/or pauses (e.g., due to undesired operating behavior), and/or (iii) improve computing resource availability for desired computer implemented services by reducing computing resource expenditures for management and/or remedial action. Additionally, the system may also provide an efficient manner of identify relationships between the operation of data processing systems and similar behavior of such systems in the past. The identified behavior may facilitate root cause analysis of problems that may impact multiple data processing systems.

When providing its functionality, deployment manager may perform all, or a portion, of the methods and/or actions shown in FIGS. 3A-4C.

Data processing systems 100 and/or data processing system manager 110 may be implemented using a computing device such as a host or server, a personal computer (e.g., desktops, laptops, and tablets), a "thin" client, a personal digital assistant (PDA), a Web enabled appliance, or a mobile phone (e.g., Smartphone), an embedded system, local controllers, and/or any other type of data processing device or system. For additional details regarding computing devices, refer to FIG. 5.

Any of the components illustrated in FIG. 1 may be operably connected to each other (and/or components not illustrated) with a communication system 105. In an embodiment, communication system 105 includes one or more networks that facilitate communication between any number of components. The networks may include wired networks and/or wireless networks (e.g., and/or the Internet). The networks may operate in accordance with any number and types of communication protocols (e.g., such as the internet protocol).

While illustrated in FIG. 1 as included a limited number of specific components, a system in accordance with an embodiment may include fewer, additional, and/or different components than those illustrated therein.

Figure 2A:
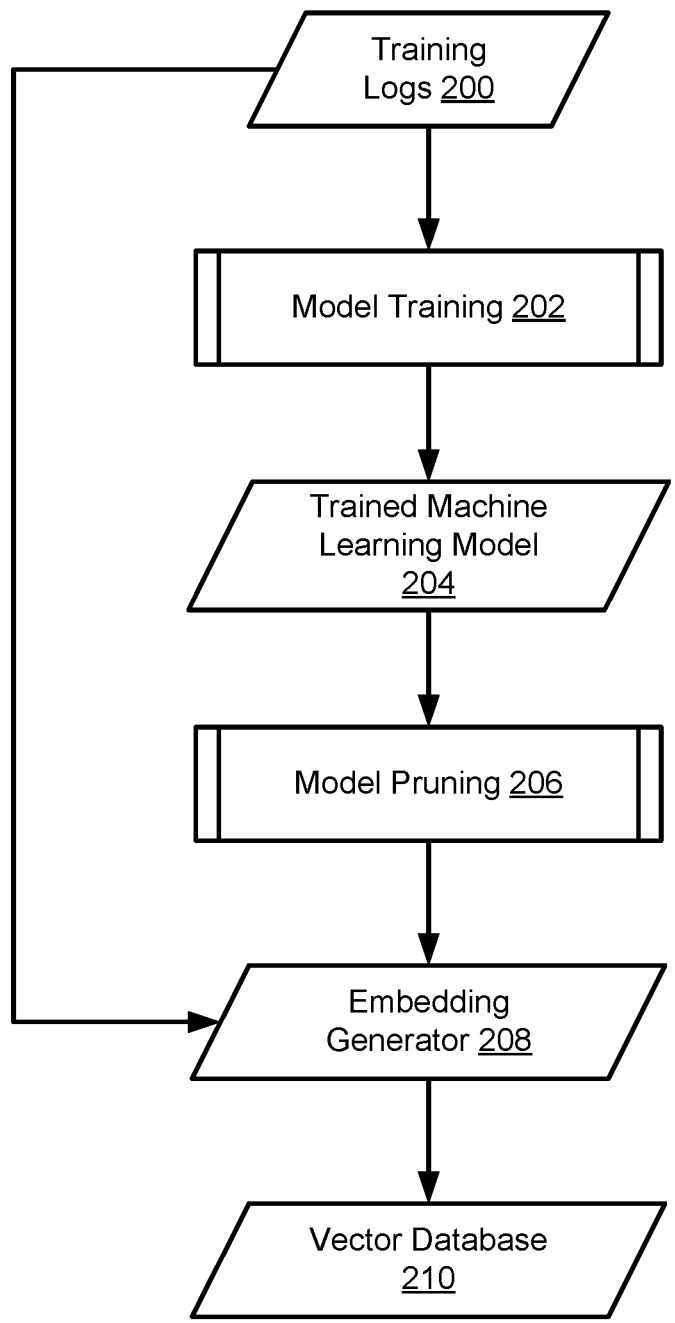
FIG. 2A shows a block diagram illustrating a process of obtaining a vector indexed database in accordance with an embodiment.

Turning to FIG. 2A, a diagram illustrating operation of a data processing system manager in accordance with an embodiment is shown. Specifically, FIG. 2A may illustrate obtained by a data processing system manager (e.g., 200, 204, 208, 210) and operations performed on the data by data processing system manager (or another device).

To manage the data processing systems, data processing system manager 110 may obtain training logs 200. Training logs may be obtained from any number of data processing systems managed by data processing system manager 110. The training logs may include any type and quantity of logs. The logs may include descriptions of actions leading up to an event, and/or a description of an event. The logs may be implemented with structure or unstructured data.

To utilize the logs, data processing system manager 110 may perform actions to obtain vector database 210. Vector database 210 may facilitate rapid identification of similarities between logs. To obtain vector database 210, data processing system manager 110 may perform model training 202 to obtain one or more trained machine learning models. The trained machine learning models may be, for example, implemented supervised learning (e.g., if training logs 200 are labeled) or unsupervised learning (e.g., if training logs 200 are unlabeled). The trained machine learning models may be implemented using other modalities (e.g., semi-supervised learning, reinforced learning, associative rules, etc.).

The models may, for example, be implemented with artificial neural networks, decision trees, support-vector machines, regression analysis, Bayesian networks, genetic algorithms, and/or any other type of model usable for learning purposes.

The trained machine learning models may include any number of embedding layers. The embedding layers may include similar or different numbers of elements corresponding to vectors. When data is taken as input, the data may be projected onto the first embedding layer. The value of each element of each subsequent embedding layer may depend on the value of one or more elements of the previous embedding layer. The final embedding layer may then be used to obtain an output (e.g., through transformation, projection, mapping, etc.).

To identify similarities between logs in a time and/or computationally efficient manner, vector database 210 may not use the output of the machine learning models. Rather, vector database 210 may be populated with an intermediate vector implemented by the trained machine learning model. By doing so, only reduced sized representations of logs may be used as the basis for identifying similarities between the logs.

Figure 2B:
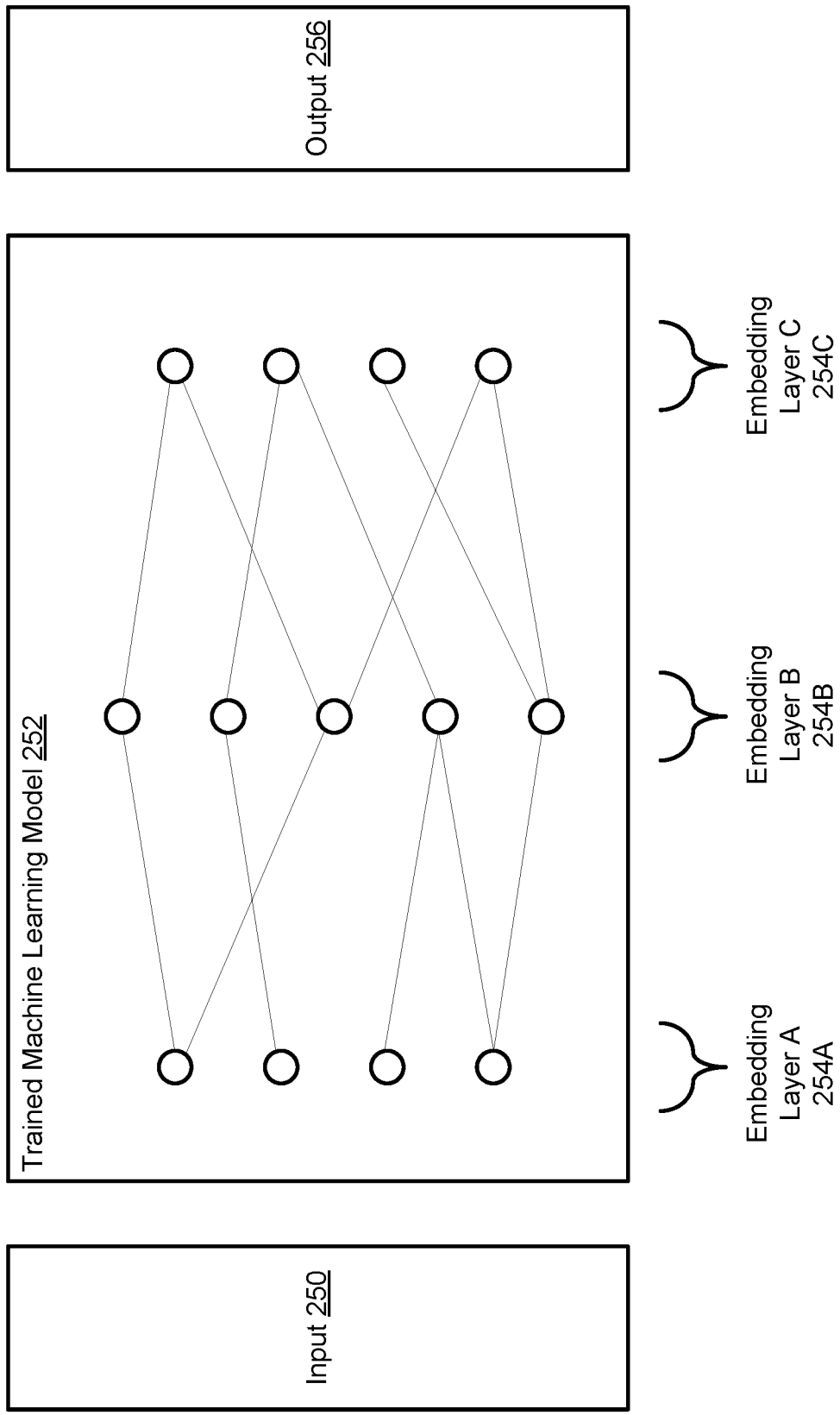
FIG. 2B shows a block diagram illustrating a trained machine learning model in accordance with an embodiment.

To obtain the intermediate vectors implemented by the trained machine learning model, the trained machine learning model may be subjected to model pruning 206. During model pruning, the model may be truncated at one of the embedding layers such that when a log is used as input to the pruned trained machine learning model, the output may be the intermediate vector value of a selected embedding layer. The pruned trained machine learning model may be used as an embedding generator that take, as input, logs (or portions thereof) and provides, as output, a vector corresponding to the input. Refer to FIGS. 2B-2C for graphical representations of trained machine learning models and an embedding generator.

To obtain the vector database, training logs 200 (or portions thereof) may be input to embedding generator 208. Embedding generator 208 may provide, as output, a vector corresponding to the input. The vector may include any number of elements, but may generally be much smaller in size when compared to a size of the input.

The vectors corresponding to the logs may then be stored in a database that is vector keyed such that vectors may be used as a key to perform lookups in the vector database, and/or other searches of the data stored therein. The database may associate the vectors with corresponding logs, events corresponding to the logs, data processing systems from which the respective logs are obtained, and/or other types of information that may be useful to be able to search to manage data processing systems.

Turning to FIG. 2B, a diagram of a trained machine learning model 252 in accordance with an embodiment is shown. Trained machine learning model 252 may take input 250 and provide output 256. In the context of a trained machine learning model that is trained using supervised learning, trained machine learning model 252 may be adapted to output an event that is associated with a number of log entries of a log (e.g., some number of log entries preceding the event). If the trained machine learning model is trained using unsupervised learning, then trained machine learning model 252 may be adapted to output match logs to similar logs (e.g., a log entries to log entries relationship may be used for training purposes rather than a log entries to even relationship may be used for training purposes in supervised learning when labeled data is available).

Trained machine learning model 252 may include any number of embedding layers 254A-254C. The embedding layers may be vectors with each element in the respective vector having an associated value. Different embedding layers may include different numbers of elements. When input 250 is received by trained machine learning model 252, the values of the vector associated with embedding layer A 254A may be determined based on some number of projections, transformations, etc. Then, the values of each subsequent embedding layer may be sequentially determined. The values of the vectors of each subsequent layer may depend on any or none of the values of the elements of the previous embedding layer. In FIG. 2B, the elements of each vector are represented by the circles positioned in respective columns, and the operations performed to obtain the value of the elements of the vectors of the subsequent embedding layers are illustrated by the lines between the circles in each column. While illustrated in FIG. 2B as including a specific number of elements and embedding layers, a trained machine learning model 252 in accordance with an embodiment may include any number of embedding layers with associated vectors that include any number of elements.

To obtain an embedding, one of the embedding layers of the trained machine learning model may be selected. The subsequent layers and output layers (e.g., projecting/mapping/etc. to obtain output 256) may be pruned.

Turning to FIG. 2C, a diagram illustrating embedding generator 260 in accordance with an embodiment is shown. As seen in FIG. 2C, embedding layer B 254B may have been selected resulting in the subsequent and output layers of the trained machine learning model being removed to obtain embedding generator 260.

In contrast to the trained machine learning model (e.g., which may output an identifier of an event or log entries), embedding generator 260 may output a vector representation of an input. For example, in FIG. 2C, output 256 is illustrated as being the values of embedding layer B 254B. In this figure, embedding layer B 254B is illustrated as including five elements (e.g., the five circles in the column). Thus, the output of embedding generator 260 may be a vector of five elements.

The output may then be used, as discussed above, to obtain a database usable for rapid comparison, grouping, cluster identification and/or other purposes.

Figure 3A:
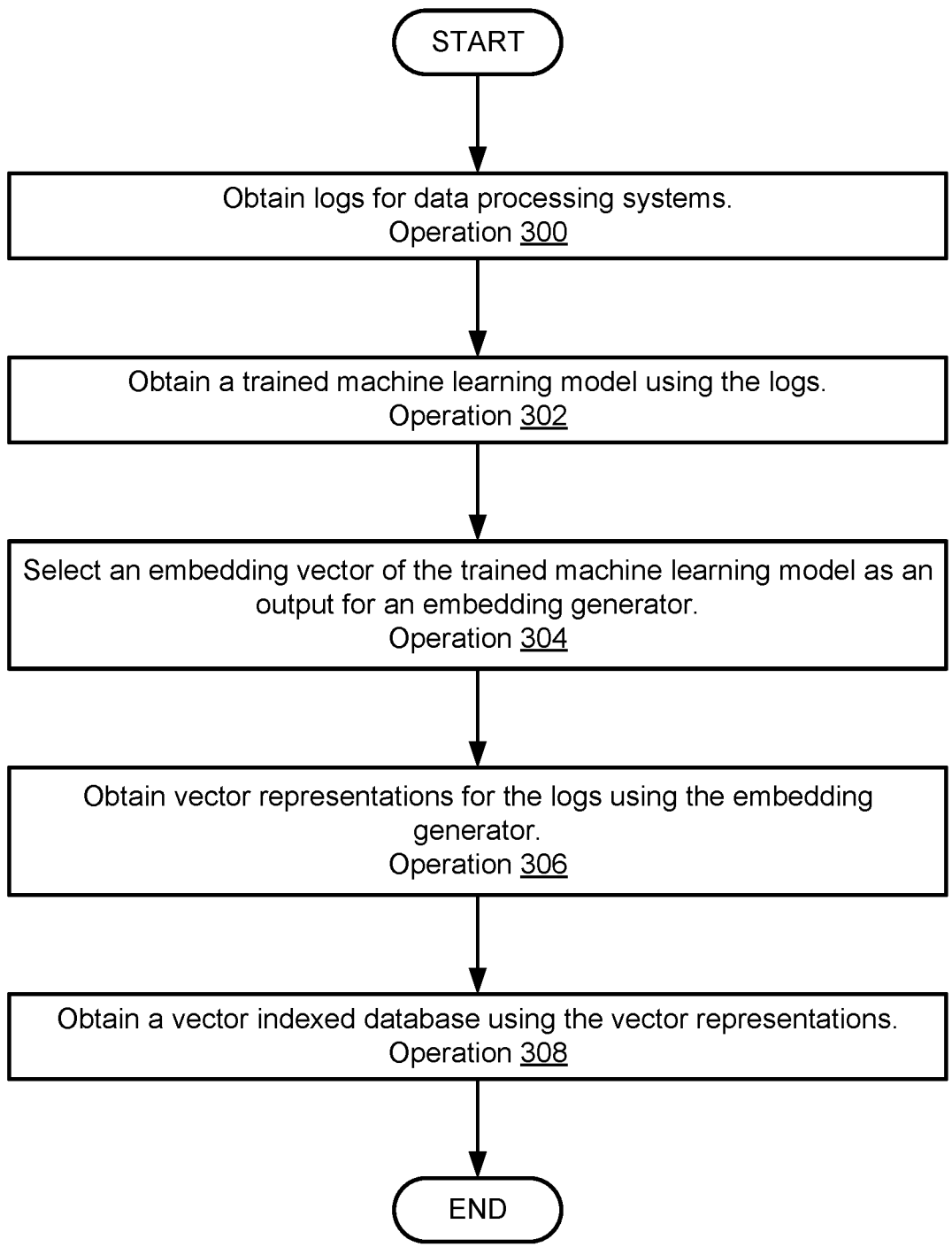
FIG. 3A shows a flow diagram illustrating a method of obtaining a vector indexed database in accordance with an embodiment.
Figure 3B:
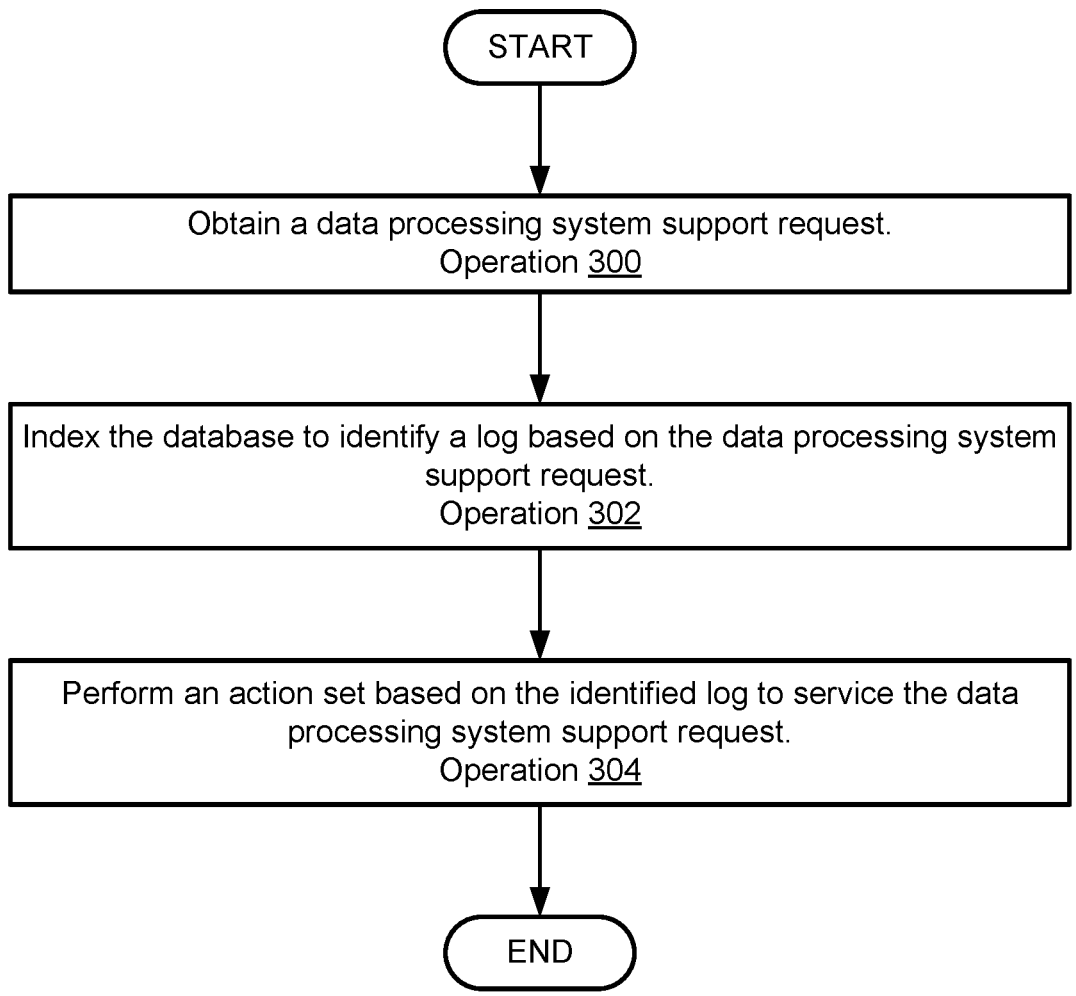
FIG. 3B shows a flow diagram illustrating a method of servicing a support request in accordance with an embodiment.

As discussed above, the components of FIG. 1 may perform various methods to increase the likelihood of data processing systems being able to provide computer implemented services. FIGS. 3A-3B show diagrams of methods that may be performed by the system of FIG. 1. In each of these figures, any of the operations may be performed in different orders, skipped, repeated, and/or be performed in a parallel or partially overlapping in time manner.

Turning to FIG. 3A, a flow diagram illustrating a method of obtaining a vector indexed database in accordance with an embodiment is shown.

At operation 300, logs for data processing systems are obtained. The logs may be obtained by receiving them from the data processing systems (e.g., which may generate and provide the logs) or by obtaining them from other sources (e.g., from devices which may aggregate and/or store logs for other devices). Any quantity of logs may be obtained. The logs may be obtained via network communications between the data processing system manager and other devices.

At operation 302, a trained machine learning model is obtained using the logs. The trained machine learning model may be obtained using any machine learning technique that results in the generation of embedding layers or other types of vector based data structures.

In an embodiment, the trained machine learning model is obtained based on relationships in the logs. For example, the logs may include any number of log entries indicating pieces of information regarding the operation of a data processing system prior to an event (e.g., which may also be indicated by a log entry). The logs may be used to establish relationships between log entries preceding an event and the event.

If labeled data is unavailable such that relationships between log entries preceding an event and an event are unable to be obtained, then the machine learning models may be trained to output log entries on the basis of log entries as input (e.g., via an auto encoder based model training approach). These relationships may be used to train the machine learning model.

At operation 304, an embedding vector of the trained machine learning model is selected as an output for an embedding generator. The embedding vector may be selected on any basis (e.g., a predetermined layer or a dynamically selected layer). The embedding vector may be selected, for example, as a last or near last embedding layer such that similar input from taken by the embedding generator results in similar vectors being generated in the selected embedding layer.

The trained machine learning model may then be pruned to obtain the embedding generator. Pruning may include disabling and/or removing the layers (e.g., embedding, projection, etc.) subsequent to the selected embedding layer.

At operation 306, vector representations for the logs are obtained using the embedding generator. The vector representations may be obtained by providing all, or portions, of the respective logs as input to the embedding generator. The embedding generator may generate a vector, as output, for the respective inputs.

At operation 308, a vector indexed database is obtained using the vector representations. The vector indexed database may be obtained by building a database keyed to the vector representations. The keying may allow for the database to be efficiently searched based on vector representations. Various metadata may be associated with each vector representation. The metadata may include, for example, associated data processing systems, logs, events, and/or other information. The database may be implemented using any type of data structure such as, for example, a table, linked list, database, etc.

The method may end following operation.

Using the method illustrated in FIG. 3A, a vector indexed database may be obtained that is usable for rapid searching and/or analysis of logs in a distributed system.

Turning to FIG. 3B, a flow diagram illustrating a method of servicing a data processing system support request in accordance with an embodiment is shown.

At operation 300 a data processing system support request is obtained. The data processing support request may be obtained from a data processing device operably connected to the data processing system manager. The request may request, for example, that logs similar to a particular log be identified, that clusters of logs and/or graphical representations thereof be provided, that action be taken to resolve a potential issue, that future potential issues impacting a data processing system be identified, and/or other types of action, analysis, and/or remediation actions be taken.

In an embodiment, the data processing system support request includes a log pattern (e.g., a series of log entries) for a new log that has been obtained from a data processing system. The data processing system may be operating nominally or may be manifesting undesired operation.

At operation 302, the vector indexed database is indexed to identify a log based on the data processing system support request.

In an embodiment, the vector indexed database is index by obtaining a vector representation for the new log using the embedding generator. The vector representation may then be used as a key to perform a nearest neighbor lookup in the vector indexed database to identify a vector of the vector representations in the vector indexed database. The metadata associated with the identified vector may be used to identify the related log of the logs. A copy of the related log may be returned to a requestor to service the data processing system support request.

The nearest neighbor looking may be performed via any algorithm. For example, the distance between the vectors nearest the newly obtained vector may be calculated and used to rank the vectors. The highest or some number of highly ranked vectors may be used as the related log or logs. Refer to FIG. 4B for additional details regarding nearest neighbor identification.

In an embodiment, the vector indexed database is index by identifying clusters of the vector representations of the logs. The clusters may be obtained via any clustering method. The clusters may have members of any number of members. In an embodiment, the clusters are generated based on a similarity measure between the vectors. The vectors having similarities above a threshold may be grouped into clusters. The threshold may be increased or decreased until a predetermined number of clusters are obtained, each cluster has a maximum or minimum members, or via other methods.

Once the clusters are obtained, a vector representation for the new log may be obtained using the embedding generator. The clustering and new vector representation may be used to obtain a graphical representation. Refer to FIG. 4C for additional details regarding graphical representations of clustering.

The graphical representation may be presented to a user and input from the user may be obtained. The user input may include an indication with respect to one of the clusters. For example, a user may use the graphical representation to select a cluster. The related log may then be identified based on the selected cluster. For example, a log associated with one of the vectors having members in the selected cluster may be identified.

At operation 304, an action set based on the identified log is performed to service the data processing system support request.

The action set may include (i) notifying an administrator a future event (e.g., associated with the identified log), (ii) performing a reconfiguration of a data processing system based on the future event, (iii) transferring workloads from the data processing system to other data processing systems, (iv) disabling a function of a data processing system, (v) disabling a hardware components of the data processing system, (vi) providing information regarding an identified cluster of data processing systems, (vii) providing graphical representations of the clustering, and/or (viii) performing other actions that may reduce the likelihood of the data processing system being impaired in the future (e.g., to avoid the future event), allow administrators or other persons to perform root cause analysis (e.g., via cluster analysis), and/or for other purposes.

The method may end following operation 304.

As discussed above, graphical representations of the vectors in the vector indexed database may be generated. While it will be understood that a vector may be higher order entity that is not easily visualized in lower numbers of dimensions, graphical representations of some portions of the vectors may be shown and discussed with respect to FIGS. 4A-4C. Various representations of the vectors, or portions thereof, may be generated to facilitate understanding of the information content of the vectors.

Figure 4A:
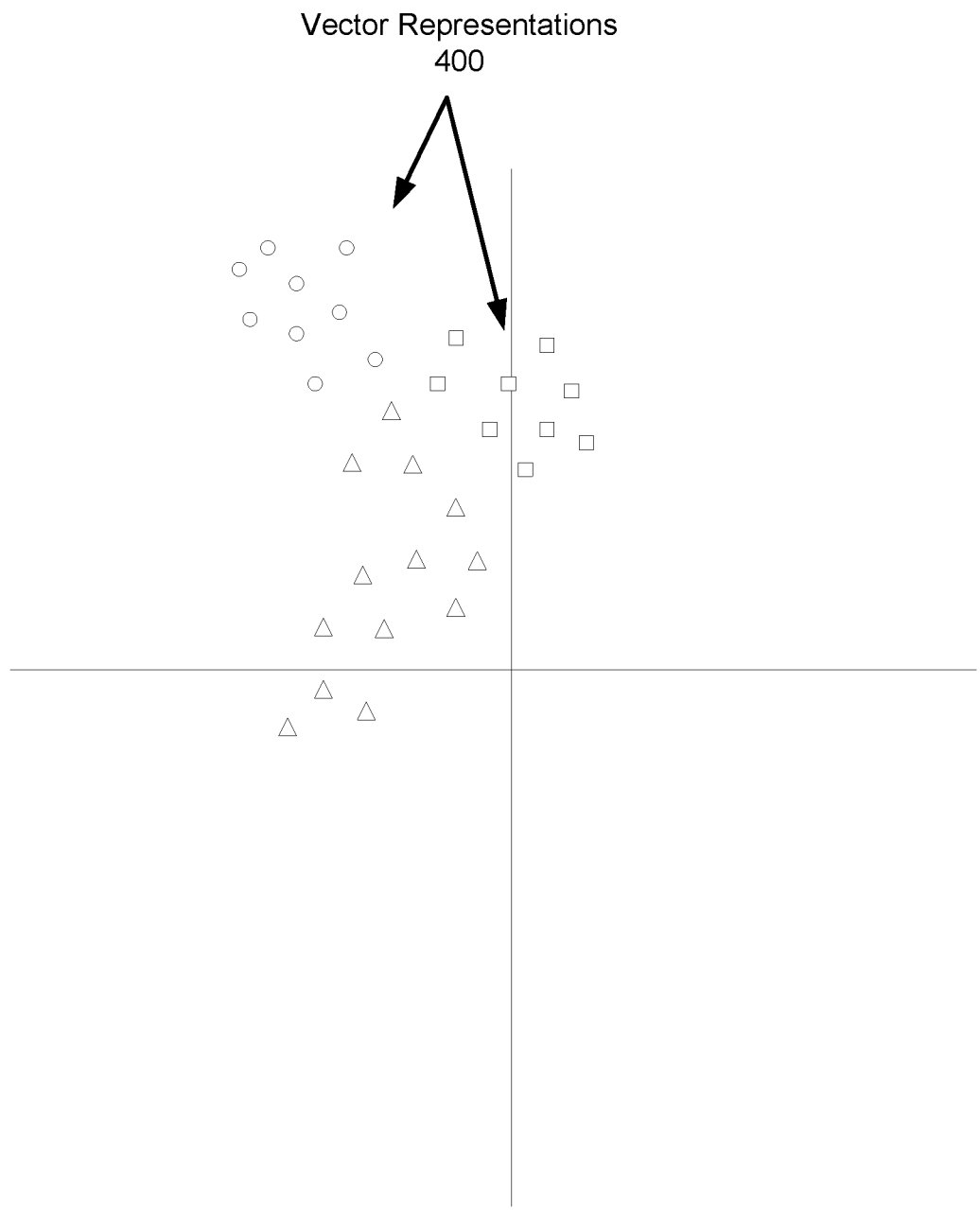
FIG. 4A shows a diagram illustrating a representation of vectors corresponding to logs in accordance with an embodiment.
Figure 4B:
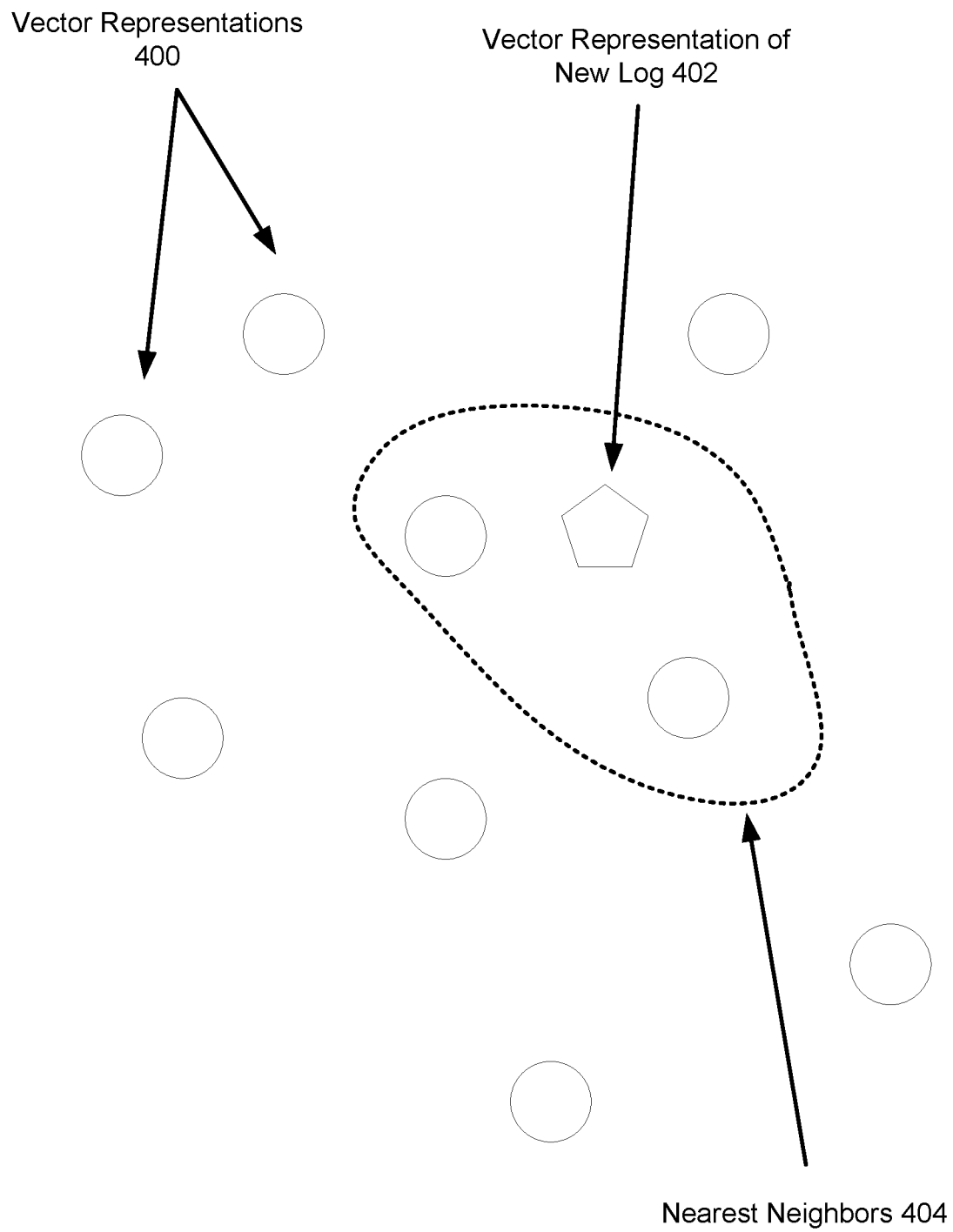
FIG. 4B shows a diagram illustrating nearest neighbor analysis of vectors corresponding to logs in accordance with an embodiment.
Figure 4C:
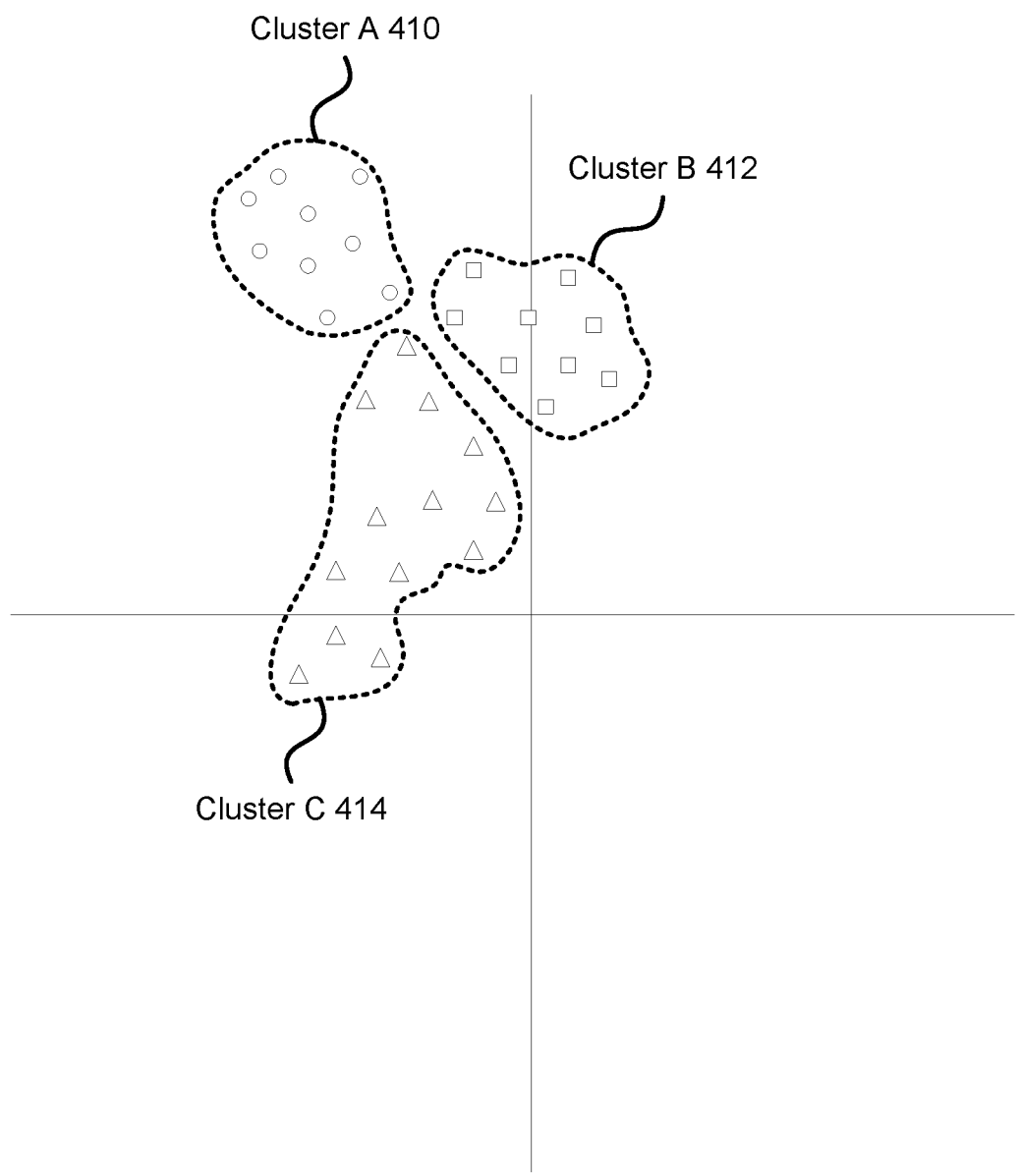
FIG. 4C shows a diagram illustrating clustering for vectors corresponding to logs in accordance with an embodiment.

Turning to FIG. 4A, a diagram illustrating a graphical representation of some vectors is shown. In FIG. 4A, three dimensions are illustrated (e.g., two dimension position on the page, and shape indicating a third dimension). Such representations may be useful to understand the relationships between vectors.

As discussed above, nearest neighbor analysis may be performed. Turning to FIG. 4B, a diagram illustrated a portion of the graphical representation shown in FIG. 4A is shown. As seen in FIG. 4B, the graphical representation may include any number of vector representations. These vector representations may represent logs that have been analyzed. When a new log is encountered, a corresponding vector may be generated via the embedding generator. The vector representation of the new log 402 may be projected onto the graphical representation (or may not be graphically shown, but may be computed). The distance between the vector representation of the new log 402 and the other vector representations 400 may be computed to identify the nearest neighbors 404. These nearest neighbors 404 may be identified as the logs associated with or similar to the new log.

Like nearest neighbor analysis, graphical representations for clustering of the vectors may also be performed. Turning to FIG. 4C, a diagram illustrating the graphical representation shown in FIG. 4A is shown. Once the vectors are clustered based on their similarities, graphical elements corresponding to the clusters 410, 412, and 414 may be superimposed on the graphical representation. For example, coloring, shading, outlining, and/or other methods of highlighting clusters may be implemented.

When new logs are encountered, representations of their corresponding vectors may be added thereby allowing a data scientist or other person to understand relationships between the respective clusters and the newly obtained logs. The person may provide input by, for example, selecting the graphical representation indicating a clustering. When the user input is received, information regarding the clustering and corresponding logs, data processing systems, etc. may be provided.

Thus, as illustrated above, embodiments disclosed herein may provide systems and methods usable to analysis and managed data processing systems. By utilizing vectors to represent the logs obtained from data processing systems, the similarities between logs and related events may be efficiently identified in an automated fashion. Thus, embodiments disclosed herein may provide an improved computing device that is able to extract useful information from unstructured or lightly structured data usable for management purposes. Further, the disclosed process may facilitate identification of relationships that a person may easily overlook. Accordingly, the disclosed process provides for both an embodiment in computing technology and also an improved method for device management. Rather than relying on a person's intuition or expert knowledge, an automated process for analysis may be provided.

Figure 5:
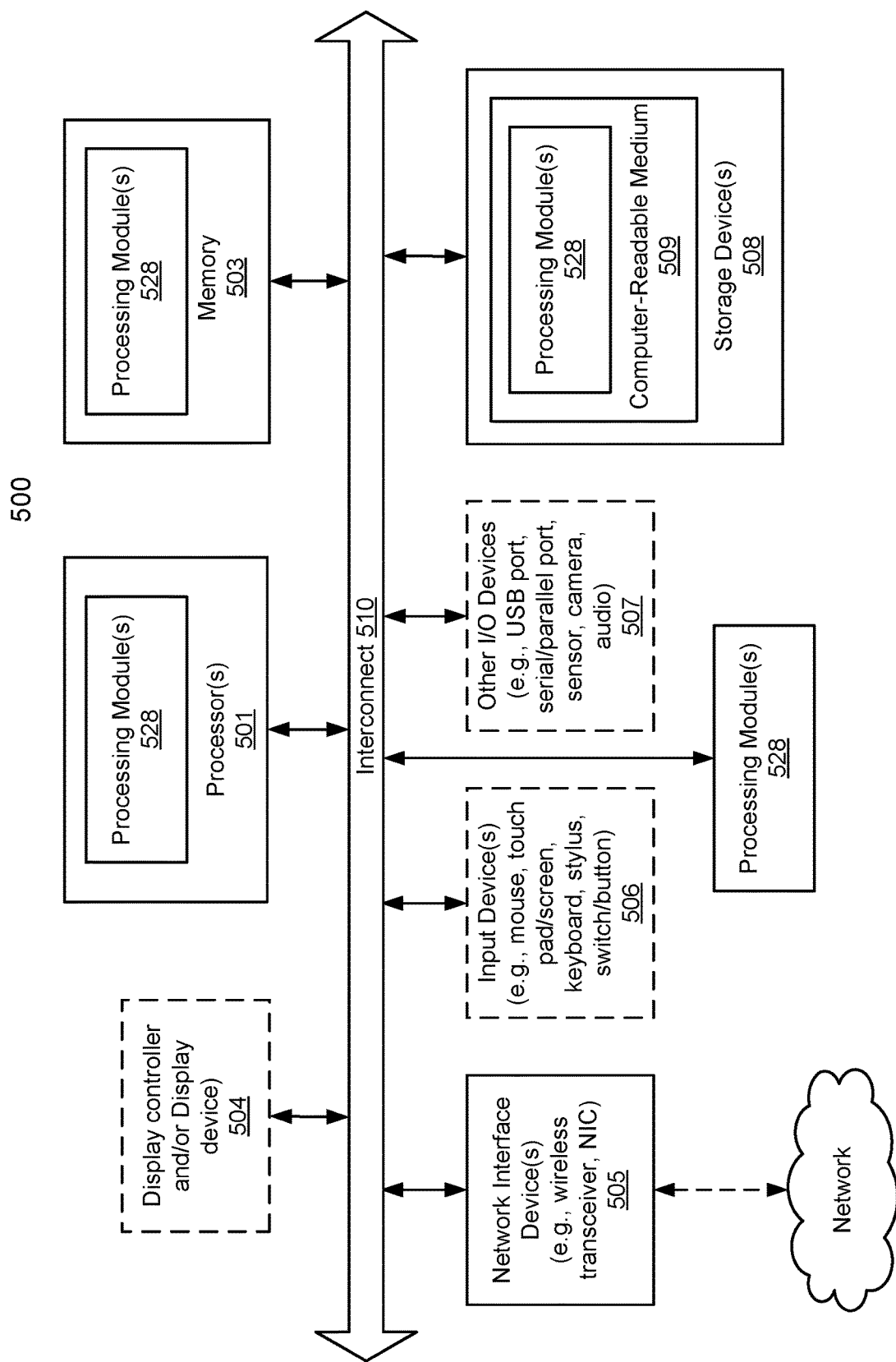
FIG. 5 shows a block diagram illustrating a data processing system in accordance with an embodiment.

Any of the components illustrated in FIGS. 1-4C may be implemented with one or more computing devices. Turning to FIG. 5, a block diagram illustrating an example of a data processing system (e.g., a computing device) in accordance with an embodiment is shown. For example, system 500 may represent any of data processing systems described above performing any of the processes or methods described above. System 500 can include many different components. These components can be implemented as integrated circuits (ICs), portions thereof, discrete electronic devices, or other modules adapted to a circuit board such as a motherboard or add-in card of the computer system, or as components otherwise incorporated within a chassis of the computer system. Note also that system 500 is intended to show a high level view of many components of the computer system. However, it is to be understood that additional components may be present in certain implementations and furthermore, different arrangement of the components shown may occur in other implementations. System 500 may represent a desktop, a laptop, a tablet, a server, a mobile phone, a media player, a personal digital assistant (PDA), a personal communicator, a gaming device, a network router or hub, a wireless access point (AP) or repeater, a set-top box, or a combination thereof. Further, while only a single machine or system is illustrated, the term "machine" or "system" shall also be taken to include any collection of machines or systems that individually or jointly execute a set (or multiple sets) of instructions to perform any one or more of the methodologies discussed herein.

In one embodiment, system 500 includes processor 501, memory 503, and devices 505-508 via a bus or an interconnect 510. Processor 501 may represent a single processor or multiple processors with a single processor core or multiple processor cores included therein. Processor 501 may represent one or more general-purpose processors such as a microprocessor, a central processing unit (CPU), or the like. More particularly, processor 501 may be a complex instruction set computing (CISC) microprocessor, reduced instruction set computing (RISC) microprocessor, very long instruction word (VLIW) microprocessor, or processor implementing other instruction sets, or processors implementing a combination of instruction sets. Processor 501 may also be one or more special-purpose processors such as an application specific integrated circuit (ASIC), a cellular or baseband processor, a field programmable gate array (FPGA), a digital signal processor (DSP), a network processor, a graphics processor, a network processor, a communications processor, a cryptographic processor, a co-processor, an embedded processor, or any other type of logic capable of processing instructions.

Processor 501, which may be a low power multi-core processor socket such as an ultra-low voltage processor, may act as a main processing unit and central hub for communication with the various components of the system. Such processor can be implemented as a system on chip (SoC). Processor 501 is configured to execute instructions for performing the operations discussed herein. System 500 may further include a graphics interface that communicates with optional graphics subsystem 504, which may include a display controller, a graphics processor, and/or a display device.

Processor 501 may communicate with memory 503, which in one embodiment can be implemented via multiple memory devices to provide for a given amount of system memory. Memory 503 may include one or more volatile storage (or memory) devices such as random access memory (RAM), dynamic RAM (DRAM), synchronous DRAM (SDRAM), static RAM (SRAM), or other types of storage devices. Memory 503 may store information including sequences of instructions that are executed by processor 501, or any other device. For example, executable code and/or data of a variety of operating systems, device drivers, firmware (e.g., input output basic system or BIOS), and/or applications can be loaded in memory 503 and executed by processor 501. An operating system can be any kind of operating systems, such as, for example, Windows® operating system from Microsoft®, Mac OS®/iOS® from Apple, Android® from Google®, Linux®, Unix®, or other real-time or embedded operating systems such as VxWorks.

System 500 may further include 10 devices such as devices (e.g., 505, 506, 507, 508) including network interface device(s) 505, optional input device(s) 506, and other optional 10 device(s) 507. Network interface device(s) 505 may include a wireless transceiver and/or a network interface card (NIC). The wireless transceiver may be a WiFi transceiver, an infrared transceiver, a Bluetooth transceiver, a WiMax transceiver, a wireless cellular telephony transceiver, a satellite transceiver (e.g., a global positioning system (GPS) transceiver), or other radio frequency (RF) transceivers, or a combination thereof. The NIC may be an Ethernet card.

Input device(s) 506 may include a mouse, a touch pad, a touch sensitive screen (which may be integrated with a display device of optional graphics subsystem 504), a pointer device such as a stylus, and/or a keyboard (e.g., physical keyboard or a virtual keyboard displayed as part of a touch sensitive screen). For example, input device(s) 506 may include a touch screen controller coupled to a touch screen. The touch screen and touch screen controller can, for example, detect contact and movement or break thereof using any of a plurality of touch sensitivity technologies, including but not limited to capacitive, resistive, infrared, and surface acoustic wave technologies, as well as other proximity sensor arrays or other elements for determining one or more points of contact with the touch screen.

IO devices 507 may include an audio device. An audio device may include a speaker and/or a microphone to facilitate voice-enabled functions, such as voice recognition, voice replication, digital recording, and/or telephony functions. Other IO devices 507 may further include universal serial bus (USB) port(s), parallel port(s), serial port(s), a printer, a network interface, a bus bridge (e.g., a PCI-PCI bridge), sensor(s) (e.g., a motion sensor such as an accelerometer, gyroscope, a magnetometer, a light sensor, compass, a proximity sensor, etc.), or a combination thereof. IO device(s) 507 may further include an imaging processing subsystem (e.g., a camera), which may include an optical sensor, such as a charged coupled device (CCD) or a complementary metal-oxide semiconductor (CMOS) optical sensor, utilized to facilitate camera functions, such as recording photographs and video clips. Certain sensors may be coupled to interconnect 510 via a sensor hub (not shown), while other devices such as a keyboard or thermal sensor may be controlled by an embedded controller (not shown), dependent upon the specific configuration or design of system 500.

To provide for persistent storage of information such as data, applications, one or more operating systems and so forth, a mass storage (not shown) may also couple to processor 501. In various embodiments, to enable a thinner and lighter system design as well as to improve system responsiveness, this mass storage may be implemented via a solid state device (SSD). However, in other embodiments, the mass storage may primarily be implemented using a hard disk drive (HDD) with a smaller amount of SSD storage to act as a SSD cache to enable non-volatile storage of context state and other such information during power down events so that a fast power up can occur on re-initiation of system activities. Also a flash device may be coupled to processor 501, e.g., via a serial peripheral interface (SPI). This flash device may provide for non-volatile storage of system software, including a basic input/output software (BIOS) as well as other firmware of the system.

Storage device 508 may include computer-readable storage medium 509 (also known as a machine-readable storage medium or a computer-readable medium) on which is stored one or more sets of instructions or software (e.g., processing module, unit, and/or processing module/unit/logic 528)

embodying any one or more of the methodologies or functions described herein. Processing module/unit/logic 528 may represent any of the components described above. Processing module/unit/logic 528 may also reside, completely or at least partially, within memory 503 and/or within processor 501 during execution thereof by system 500, memory 503 and processor 501 also constituting machine-accessible storage media. Processing module/unit/logic 528 may further be transmitted or received over a network via network interface device(s) 505.

Computer-readable storage medium 509 may also be used to store some software functionalities described above persistently. While computer-readable storage medium 509 is shown in an exemplary embodiment to be a single medium, the term "computer-readable storage medium" should be taken to include a single medium or multiple media (e.g., a centralized or distributed database, and/or associated caches and servers) that store the one or more sets of instructions. The terms "computer-readable storage medium" shall also be taken to include any medium that is capable of storing or encoding a set of instructions for execution by the machine and that cause the machine to perform any one or more of the methodologies of embodiments disclosed herein. The term "computer-readable storage medium" shall accordingly be taken to include, but not be limited to, solid-state memories, and optical and magnetic media, or any other non-transitory machine-readable medium.

Processing module/unit/logic 528, components and other features described herein can be implemented as discrete hardware components or integrated in the functionality of hardware components such as ASICS, FPGAs, DSPs or similar devices. In addition, processing module/unit/logic 528 can be implemented as firmware or functional circuitry within hardware devices. Further, processing module/unit/logic 528 can be implemented in any combination hardware devices and software components.

Note that while system 500 is illustrated with various components of a data processing system, it is not intended to represent any particular architecture or manner of interconnecting the components; as such details are not germane to embodiments disclosed herein. It will also be appreciated that network computers, handheld computers, mobile phones, servers, and/or other data processing systems which have fewer components or perhaps more components may also be used with embodiments disclosed herein.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as those set forth in the claims below, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Embodiments disclosed herein also relate to an apparatus for performing the operations herein. Such a computer program is stored in a non-transitory computer readable medium. A non-transitory machine-readable medium includes any mechanism for storing information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices).

The processes or methods depicted in the preceding figures may be performed by processing logic that comprises hardware (e.g. circuitry, dedicated logic, etc.), software (e.g., embodied on a non-transitory computer readable medium), or a combination of both. Although the processes or methods are described above in terms of some sequential operations, it should be appreciated that some of the operations described may be performed in a different order. Moreover, some operations may be performed in parallel rather than sequentially.

Embodiments disclosed herein are not described with reference to any particular programming language. It will be appreciated that a variety of programming languages may be used to implement the teachings of embodiments disclosed herein.

In the foregoing specification, embodiments have been described with reference to specific exemplary embodiments thereof. It will be evident that various modifications may be made thereto without departing from the broader spirit and scope of the embodiments disclosed herein as set forth in the following claims. The specification and drawings are, accordingly, to be regarded in an illustrative sense rather than a restrictive sense.

What is claimed is:

1. A computer-implemented method for managing data processing systems, the method comprising:
   obtaining logs for the data processing systems, each of the logs comprising log entries associated with an event;
   obtaining a trained machine learning model using the logs for the data processing systems, the trained machine learning model comprising a plurality of embedding vectors;
   selecting, after obtaining the trained machine learning model, one of the embedding vectors as an output for an embedding generator, wherein the embedding generator is obtained by pruning the trained machine learning model;
   obtaining, using the logs and the embedding generator, vector representations for the logs;
   storing the vector representations in a vector indexing based database;
   obtaining a data processing system support request for a data processing system of the data processing systems, the support request including a log pattern, wherein the method is executed by a data processing system manager that is distinct and separate from the data processing system from which the data processing system support request is obtained;
   indexing, using the log pattern, the database to identify a related log of the logs; identifying the event associated with the related log; and performing an action set, based on the event, to service the data processing system support request, wherein performing the action set based on the event comprises:

disabling, by the data processing system manager, one or more hardware components of the data processing system from which the data processing system support request is obtained.

2. The computer-implemented method of claim 1, wherein the data processing system support request is a request to obtain a log of the logs that is similar to a new log from which the log pattern was obtained, wherein the data processing system support request is obtained from the data processing system of the data processing systems, and wherein the data processing system is separate from the trained machine learning model.

3. The computer-implemented method of claim 2, wherein indexing the database comprises:

obtaining a vector representation for the new log using the embedding generator; performing a nearest neighbor lookup in the database using the vector representation of the new log and the database to identify a vector of the vector representations in the database;
identifying the related log of the logs based on the identity of the vector of the vector representations in the database; and
returning a copy of the related log to a requestor to service the data processing system support request.

4. The computer-implemented method of claim 2, wherein indexing the database comprises:

identifying clusters of the vector representations of the logs;
obtaining a vector representation for the new log using the embedding generator;
obtaining a graphical representation of the clusters and the vector representation for the new log;
obtaining user input based on the graphical representation, the user input indicating one cluster of the clusters; and
identifying the related log based on the one cluster.

5. The computer-implemented method of claim 1, wherein the logs are labeled, the trained machine learning model is trained using a supervised training method, the trained machine learning model is adapted to output an event associated with the log entries of the logs based on an input.

6. The computer-implemented method of claim 1, wherein the logs are unlabeled, the trained machine learning model is trained using an unsupervised training method, the trained machine learning model is adapted to output a log entry of the logs based on an input.

7. The computer-implemented method of claim 1, wherein the action set further comprises:

transferring a workload from a first data processing system of the data processing systems to a second data processing system of the data processing systems.

8. The computer-implemented method of claim 1, wherein the action set further comprises:

disabling a hardware component of a data processing system of the data processing systems.

9. The computer-implemented method of claim 1, wherein the action set comprises:

sending a notification to an administrator of a data processing system of the data processing systems of a predicted impairment of the data processing system.

10. The computer-implemented method of claim 1, wherein pruning the trained machine learning model to obtain the embedding generator comprises disabling, within an embedding vector architecture of the trained machine learning model comprising the plurality of embedding vectors, all embedding vectors that are subsequent to the one embedding vector selected as the output for the embedding generator.

11. A non-transitory machine-readable medium having instructions stored therein, which when executed by a processor, cause the processor to perform operations for managing data processing systems, the operations comprising:

obtaining logs for the data processing systems, each of the logs comprising log entries associated with an event;
obtaining a trained machine learning model using the logs for the data processing systems, the trained machine learning model comprising a plurality of embedding vectors;
selecting, after obtaining the trained machine learning model, one of the embedding vectors as an output for an embedding generator, wherein the embedding generator is obtained by pruning the trained machine learning model;
obtaining, using the logs and the embedding generator, vector representations for the logs;
storing the vector representations in a vector indexing based database;
obtaining a data processing system support request for a data processing system of the data processing systems, the support request including a log pattern, wherein the method is executed by a data processing system manager that is distinct and separate from the data processing system from which the data processing system support request is obtained;
indexing, using the log pattern, the database to identify a related log of the logs;
identifying the event associated with the related log; and
performing an action set, based on the event, to service the data processing system support request, wherein performing the action set based on the event comprises:
disabling, by a data processing system manager, one or more hardware components of the data processing system from which the data processing system support request is obtained.

12. The non-transitory machine-readable medium of claim 11, wherein the data processing system support request is a request to obtain a log of the logs that is similar to a new log from which the log pattern was obtained, wherein the data processing system support request is obtained from the data processing system of the data processing systems, and wherein the data processing system is separate from the trained machine learning model.

13. The non-transitory machine-readable medium of claim 12, wherein indexing the database comprises:

obtaining a vector representation for the new log using the embedding generator;
performing a nearest neighbor lookup in the database using the vector representation of the new log and the database to identify a vector of the vector representations in the database;
identifying the related log of the logs based on the identity of the vector of the vector representations in the database; and
returning a copy of the related log to a requestor to service the data processing system support request.

14. The non-transitory machine-readable medium of claim 12, wherein indexing the database comprises:

identifying clusters of the vector representations of the logs;

obtaining a vector representation for the new log using the embedding generator;

obtaining a graphical representation of the clusters and the vector representation for the new log;

obtaining user input based on the graphical representation, the user input indicating one cluster of the clusters; and identifying the related log based on the one cluster.

15. The non-transitory machine-readable medium of claim 11, wherein the logs are labeled, the trained machine learning model is trained using a supervised training method, the trained machine learning model is adapted to output an event associated with the log entries of the logs based on an input.

16. The non-transitory machine-readable medium of claim 11, wherein the logs are unlabeled, the trained machine learning model is trained using an unsupervised training method, the trained machine learning model is adapted to output a log entry of the logs based on an input.

17. A data processing system manager, comprising:
a processor; and
a memory coupled to the processor to store instructions, which when executed by the processor, cause the processor to perform operations for managing data processing systems, the operations comprising:
obtaining logs for the data processing systems, each of the logs comprising log entries associated with an event;
obtaining a trained machine learning model using the logs for the data processing systems, the trained machine learning model comprising a plurality of embedding vectors;
selecting, after obtaining the trained machine learning model, one of the embedding vectors as an output for an embedding generator, wherein the embedding generator is obtained by pruning the trained machine learning model;
obtaining, using the logs and the embedding generator, vector representations for the logs;
storing the vector representations in a vector indexing based database;
obtaining a data processing system support request for a data processing system of the data processing systems, the support request including a log pattern,
wherein the method is executed by a data processing system manager that is distinct and separate from the data processing system from which the data processing system support request is obtained;
indexing, using the log pattern, the database to identify a related log of the logs;
identifying the event associated with the related log; and
performing an action set, based on the event, to service the data processing system support request, wherein performing the action set based on the event comprises:
disabling, by a data processing system manager, one or more hardware components of the data processing system from which the data processing system support request is obtained.

18. The data processing system manager of claim 17, wherein the data processing system support request is a request to obtain a log of the logs that is similar to a new log from which the log pattern was obtained, wherein the data processing system support request is obtained from the data processing system of the data processing systems, and wherein the data processing system is separate from the trained machine learning model of the data processing system manager.

19. The data processing system manager of claim 18, wherein indexing the database comprises:
obtaining a vector representation for the new log using the embedding generator; performing a nearest neighbor lookup in the database using the vector representation of the new log and the database to identify a vector of the vector representations in the database;
identifying the related log of the logs based on the identity of the vector of the vector representations in the database; and
returning a copy of the related log to a requestor to service the data processing system support request.

20. The data processing system manager of claim 17, wherein the logs are labeled, the trained machine learning model is trained using a supervised training method, the trained machine learning model is adapted to output an event associated with the log entries of the logs based on an input.

\* \* \* \* \*